United States Patent
Britton (10) Patent No.: US 6,340,013 B1
(45) Date of Patent: Jan. 22, 2002

(54) FOUR-STROKE INTERNAL COMBUSTION ENGINE WITH RECUPERATOR IN CYLINDER HEAD

(76) Inventor: Richard Berkeley Britton, P.O. Box 7451, Charlottesville, VA (US) 22906-7451

( * ) Notice: Subject to any disclaimer, the term of this patent is extended or adjusted under 35 U.S.C. 154(b) by 0 days.

(21) Appl. No.: 09/110,747

(22) Filed: Jul. 3, 1998

Related U.S. Application Data (60) Provisional application No. 60/051,714, filed on Jul. 3, 1997.

(51) Int. Cl.[7] .................................................. F02B 19/02
(52) U.S. Cl. ....................... 123/255; 123/258; 123/270; 123/292
(58) Field of Search ........................... 123/48 D, 79 C, 123/254, 255, 258, 270, 292

(56) References Cited

U.S. PATENT DOCUMENTS

| | | | |
|---|---|---|---|
| 155,087 A | | 9/1874 | Hirsch ...................... 60/712 X |
| 328,970 A | | 10/1885 | Place .......................... 123/68 |
| 642,176 A | * | 1/1900 | Thomson ..................... 123/1 R |
| 870,720 A | * | 11/1907 | Frith ........................... 60/620 |
| 1,111,841 A | * | 9/1914 | Koenig ......................... 123/68 |
| 1,190,830 A | | 7/1916 | Wentworth .................. 123/504 |
| 1,904,070 A | * | 4/1933 | Morgan ......................... 60/620 |
| 1,945,818 A | | 2/1934 | McPherson et al. ........... 165/51 |
| 2,671,311 A | | 3/1954 | Rohrbach ....................... 60/16 |
| 3,591,958 A | | 7/1971 | Nebgen ........................... 60/13 |
| 4,040,400 A | * | 8/1977 | Kiener ........................... 123/68 |
| 4,074,533 A | * | 2/1978 | Stockton ...................... 60/620 |
| 4,133,172 A | * | 1/1979 | Cataldo ..................... 60/39.63 |

(List continued on next page.)

FOREIGN PATENT DOCUMENTS

| | | | |
|---|---|---|---|
| CH | 307098 | * | 7/1955 |
| GB | 528391 | * | 10/1940 |
| GB | 640410 | * | 7/1950 |
| GB | 761122 | * | 11/1956 |
| GB | 1308355 | * | 2/1973 |
| GB | 1440595 | * | 6/1976 |

OTHER PUBLICATIONS

"Engineering Thermodynamics" by M. C. Potter and C. W. Somerton, McGraw–Hill, 1993.*
"Marine Gas Turbines" by John B. Woodward, John Wiley & Sons, 1975.*
"Advaned Ultra Compact Heat Exchangers", Department of Defense Fiscal Year 1998 Small Business Innovation Research Program #A98–013.*

Primary Examiner—Tony M. Argenbright
(74) Attorney, Agent, or Firm—Daniel M. Schaeffer Patent Agent (57) ABSTRACT

A recuperating four-stroke internal combustion engine obtains improves Carnot efficiency by use of a new and novel cylinder head which captures thermal energy normally thrown away in the exhaust and re-introduces it to the working cycle. This result, long sought by others, has been achieved by incorporating within the head a compact internal recuperative heat exchanger in series with a combustion chamber or pre-chamber. A recuperator-protecting valve segregates the recuperator from hot combustion gases until the gases reach maximum expansion in the cylinder. Recuperators of both common-duct and seperated-duct design are described, the separated duct recuperator permitting higher recuperator temperature and increased efficiency and a reduction in the number of valves necessary to control gas flow. A preferred embodiment employs four valves per cylinder unit, a separated duct recuperator, and an insulating liner that surrounds both the combustion chamber and the recuperator. A similar prototype recuperative engine has demonstrated that recuperation can reduce exhaust temperature as much as 600° Rankine below that attainable in an equivalent Otto Cycle engine.

11 Claims, 7 Drawing Sheets

U.S. PATENT DOCUMENTS

| | | | |
|---|---|---|---|
| 4,280,468 A | 7/1981 | Millman | 123/546 |
| 4,284,055 A | 8/1981 | Wakeman | 123/556 |
| 4,424,780 A * | 1/1984 | Trucco | 123/292 X |
| 4,532,899 A * | 8/1985 | Lorts | 123/292 |
| 4,630,447 A * | 12/1986 | Webber | 60/712 |
| 4,715,326 A * | 12/1987 | Thring | 123/3 |
| 4,781,155 A * | 11/1988 | Brucker | 123/70 V |
| 4,790,284 A | 12/1988 | Ferrenberg et al. | 123/543 |
| 4,928,658 A | 5/1990 | Ferrenberg et al. | 123/543 |
| 5,050,570 A * | 9/1991 | Thring | 123/556 |
| 5,085,179 A * | 2/1992 | Faulkner | 123/70 R |
| 5,228,415 A * | 7/1993 | Williams | 123/51 R |
| 5,454,356 A * | 10/1995 | Kawamura | 123/292 X |
| 5,465,702 A | 11/1995 | Ferrenberg | 123/543 |
| 5,499,605 A * | 3/1996 | Thring | 123/70 R |
| 5,632,255 A | 5/1997 | Ferrenberg | 123/543 |

* cited by examiner

FOUR-STROKE INTERNAL COMBUSTION ENGINE WITH RECUPERATOR IN CYLINDER HEAD

REFERENCE TO OTHER APPLICATIONS

This utility application claims the benefit of U.S. Provisional Patent Application No. 60/051,714 filed Jul. 03, 1997 and entitled:

RECUPERATIVE INTERNAL COMBUSTION ENGINE CYCLE AND MECHANISM.

This utility application is related to my U.S. application Ser. No. 09/110,740 filed Jul. 03, 1998 and entilted:

RECUPERATIVE INTERNAL COMBUSTION ENGINE WITH SEPARATE COMPRESSOR.

BACKGROUND OF THE INVENTION

1. Field of the Invention

This invention relates to piston-type internal combustion engines having a single piston and an exhaust heat recuperator which preheats the compressed air charge and passes it into a pre-chamber for combustion. The invention relates further to an engine having a recuperator and a protective valve to protect the recuperator from the combustion process.

2. Description of the Related Art

Internal combustion engines today, with the exception of Diesels, operate on what is commonly known as an Otto cycle originally patented in France in 1862 by Alphonse Beau de Rochas. In 1876, the Rochas compression cycle was incorporated into a practical engine by Nicholas A. Otto. Otto engines were immediately more efficient than Lenoir non-compressing gas engines which had been in production since 1862. Then in 1892, Rudolf Diesel invented the compression ignition engine with higher efficiency than an Otto engine. At the time, their efficiencies were about 3 to 4% for the Lenoir, 12% for the Otto, and 24% for the Diesel, and compared with their expansion ratios of approximately 1.5: 1, 2.5: 1, and 16: 1.

The low efficiencies are related to the large amount of energy remaining in the engine exhaust at the moment of release by the exhaust valve. Exhaust temperatures of 1,450° Fahrenheit or more for example were reported for the Lenoir and Otto, and around 900° F. for the Diesel. Actual gas temperatures inside the cylinders when expansion was complete were surely much higher. This is because a great deal of heat transfers to the exhaust valve and then to the exhaust port walls. For example, gas reaches about 90% equilibrium with wall temperature after flowing only ten diameters along the length of a straight pipe. In early engines, exhaust valves and ports were labyrinthine in design and thus absorbed much of the heat from the exhaust before it exitted the engine.

The better efficiency of the Diesel came about due to its very high expansion ratio, a result of the high compression ratio needed to create high temperature sufficient to auto-ignite the injected fuel. The high compression ratio and attendant gas and bearing pressures required greatly increased strength and with it, increased weight and cost. In fact, the Diesel is two to three times the weight and cost of a comparable Otto engine.

In present day Otto engines such as those used in automobiles, compression/expansion ratios are typically around 8:1 and expansion of the combustion gases is far from complete. Thus, at full load, exhaust is released at 90 to 120 pounds per square inch and 2,500 to 3,200° F. and carries away to the coolant and the atmosphere nearly half of the input fuel energy.

A partial solution to energy wastage with the exhaust has been the turbo-expansive conversion of exhaust energy to rotative energy, the rotative energy then being used to drive a turbo-compressor for boosting input air pressure to an engine. Turbines however cannot tolerate direct exhaust heat from an Otto engine nor are they suited to the pulsating exhaust flow from a single cylinder. Exhaust from several cylinders is merged to smooth the flow and passed through exposed pipes to dump part of the heat to the atmosphere so as to cool the gases by 1,000 to 1,500° F. Exhaust turbines have thus been only minimally effective in raising the efficiency of Otto engines.

Recuperative gas turbines were developed for stationary use beginning around 1950 wherein residual exhaust heat is captured and returned to the compressed air before it enters the burners. Gas turbines operate on the Brayton gas cycle and differ from the Otto cycle in that combustion takes place at constant pressure and that expansion continues typically back to atmospheric pressure. Brayton and Otto cycles are similar however in that the exhaust exitting from a gas turbine is usually at a higher temperature than the compressed air entering the combustion chamber. The opportunity thus exists for a reduction in the fuel input required, since the heat being exhausted can be used (at the cost of a heat exchanger and connecting ducting) to provide part of the heat input, with consequent increase in efficiency. A brief review of the regenerative gas-turbine cycle may be found in *Engineering Thermodynamics* by M. C. Potter and C. W. Somerton, McGraw-Hill, 1993. A more complete analysis of recuperative gas turbines may be found in *Marine Gas Turbines* by John B. Woodward, John Wiley & Sons, 1975.

Gas turbines with heat exchangers are under development today for military use as evidenced by a request for proposal published in the Department of Defense Fiscal Year 1998 Small Business Innovation Research (SBIR) Program #A98-013 Titled: *Advanced Ultra Compact Heat Exchangers.* In this request, it is noted that present day, state-of-the-art recuperated gas turbine engines use metallic heat exchangers which are exceedingly heavy and larger in volume than all the engine turbomachinery components combined, thereby precluding their use in air vehicles.

In the prior art, recuperative engines have generally had adequate recovery of exhaust heat but their transfer of heat to the working charge has been inefficient. This is because the high temperature, high grade thermal energy available in and recovered from the exhaust has been allowed to degrade prior to its transfer to the working charge. Early inventors of heat engines sought effective use of recuperators, but often compromised thermal efficiency by reducing temperatures either to protect working materials and surfaces or to avoid problems with detonation or pre-ignition in the combustible mixture.

The first known recuperative internal combustion engine of the prior art is described in U.S. Pat. No. 155,087 granted Sep. 15, 1874 to Joseph Hirsch. It has two cylinders in a vee plus an air pump adjoined at their working ends by a duct containing a regenerator and is described as a hot-air engine.

In U.S. Pat. No. 328,970 granted Oct. 27, 1885, inventor James F. Place describes a recuperative engine that uses two stage, counter-flow transfer of exhaust heat to the compressed charge. Place used two cylinders approximately 70° apart in phase to provide separate compression and expansion in his engine.

Looking now at the art related to single piston recuperative engines, U.S. Pat. No. 1,190,830 granted to J. F.

Wentworth describes a single cylinder engine having transfer of exhaust heat to the incoming air charge. Since the transfer is prior to compression, the engine cycle is not advantageously recuperative. Wentworth recognized at an early date, the utility of a thermally insulating liner in the combustion chamber and on the piston cap to reduce heat losses from combustion. The refactory metal liner was separated by a space from the cylinder head and the space filled with a refractory insulation such as asbestos.

U.S. Pat. No. 1,945,818 granted to H. L. McPherson and J. W. Weatherford describes an engine with no recuperator but having a separated combustion chamber connected by a duct to a single cylinder with a reciprocating piston therein, the piston being shaped to provide minimum clearance with the cylinder head. Fuel input and a spark plug provide for combustion within the chamber while a poppet valve controls gas flow through the duct between the chamber and the cylinder. The poppet valve is perforated by holes 23, believed to be for cooling.

U.S. Pat. No. 2,671,311 granted to H. Rohrback is similar to the engines of some of the earlier patents in the use of a liquid coolant, in this instance, by injection of coolant into the cylinder after the work stroke to cool the cylinder and piston. A condenser for the volatized liquid coolant acts as a heat exchanger to heat air being drawn therethrough for injection into the cylinder by a supercharger. The Carnot efficiency of this engine would not be significantly improved since the cycle is not recuperative.

U.S. Pat. No. 3,591,958 granted to William H. Nebgen and assigned to Treadwell Corporation, teaches the use of an external turbo-compressor to add chilled compressed air to the single cylinder of an internal combustion engine for the expressed purpose of cooling the internal parts of the engine including the piston and cylinder. At the end of the compression stroke, the compressed air is expelled from the cylinder and enters a manifold to pass through a heat recuperator. After the compressed air has been returned to the cylinder, combined with fuel, ignited and expanded in the cylinder to perform work on the piston, the exhaust is expelled to an exhaust manifold, passed through two heat recuperators in series and then to the atmosphere. Nonetheless, this hot exhaust gas is then fed back into the cylinder for admixture with additional cold, compressed air. The recuperators do not appear to be intimately associated with the working cylinder and would probably have large radiation and convection heat losses. Additionally, energy must be expended to operate the refrigerator and the turbo-compressor, which energy is not fully recoverable. As a consequence, the thermal efficiency is less than optimum.

U.S. Pat. No. 4,280,468 granted to Millman and four patents including U.S. Pat. No. 5,632,255 granted to Ferrenberg describe a single cylinder engine having a moving plate recuperator with diameter equal to the piston and including a mechanism to mechanically reciprocate the recuperator in the cylinder between the piston and the cylinder head. While this engine offers improved thermodynamic efficiency, the recuperator is located within the combustion space and exposed to combusting gases.

U.S. Pat. No. 4,284,055 granted to Anthony C. Wakeman and assigned to Lucas Industries, Limited, of Great Britain proposes to provide a low compression ratio reciprocating piston internal combustion engine wherein exhaust heat is recovered in a recuperative heat exchanger located within the working volume of the cylinder above the top dead center of the piston and below the cylinder head. With this arrangement, it again appears that the recuperative heat exchanger is directly exposed to combusting gases. Wakeman uses an additional piston to displace gases through the recuperator.

There is of course another group of engines, generally called Stirling engines, which have recuperators for internal gas exchange. This art is considered unrelated since the engines have external combustion and the temperature at which the recuperator operates is considerably lower than in the cited art.

The problem with most of these cited internal combustion engines employing a heat exchanger or recuperator of one type or another is the large radiative and convective heat loss caused by the exposed location and/or the large size of the heat exchanging element. As pointed out in the discussion of individual patents, heat losses from the recuperator lower the Carnot efficiency. In the very few instances in the prior art where the recuperator is not subject to radiation and convection losses, the recuperator is located in the working cylinder or in a duct directly connected with the working cylinder and the recuperator is thus directly exposed to the flame front of the ignited charge.

BRIEF SUMMARY OF THE INVENTION

Intermediate between the Otto and the Diesel there has remained the possibility of an engine type which would extract more energy from the combustion gas but without the weight and cost penalties of the Diesel. A direct approach has been to capture heat from the exhaust and put it back into a subsequent engine cycle. This process of recovering heat has been referred to in the prior art as regeneration, heat exchanging, heat recycling and recuperation. The latter term will be used herein. Recuperation is believed to be effective only when the recovered heat is put into the charge after the charge is trapped in the working chambers of the engine. The term "recuperative engine" will also be reserved in this specification for those engines which have positive displacement, an actual throughput of combustion gas, and combustion taking place internally within a working chamber.

A recuperative or heat exchanging cycle, referred to hereafter as the Hx Cycle (pronounced "wix"), will be used herein to refer to an engine cycle wherein heat captured from the exhaust is used to heat a subsequent compressed charge.

The maximum efficiency that a heat engine such as the Otto Cycle engine can have is calculable by Carnot's Law. This law states:

$$\text{Maximum possible efficiency} = \eta = 1 - \frac{T_{Low}}{T_{High}}$$

$T_{High}$ in the above equation is the combustion temperature, and $T_{LOW}$ is the exhaust temperature.

The maximum possible efficiency of the Hx Cycle, where $DT_{rec}$ is the temperature reduction achieved in the engine exhaust by the recuperator, is:

$$\text{Max. possible recuperative efficiency} = \eta = 1 - \frac{T_{Low} - \Delta T_{rec}}{T_{High} + \Delta T_{rec}}$$

Putting in typical temperatures in degrees Rankine for an Otto engine at peak output, but with recuperation, we get:

$$\text{Maximum efficiency}, \eta = 1 - \left(\frac{3,000 - 600}{5,500 + 600}\right) = .606$$

For the Otto engine without recuperator, the efficiency maximum is:

$$\text{Maximum efficiency}, \eta = 1 - \left(\frac{3,000}{5,500}\right) = .455$$

Six hundred Rankine degrees of recuperation, the amount obtained in tests of a prototype, thus raises the ideal efficiency from 45.5% to 60.6%. It must be understood that these numbers are good only for comparative purposes and in actuality, one may obtain only around one-half of their value, the Otto engine today providing about 22 to 25% efficiency in automotive use. Many factors have not been accounted for such as heat losses to the combustion chamber and recuperator walls, gas flow losses due to resistance to compressed charge flow through the recuperator into the combustion chamber, and to exhaust flow from the expander cylinder out through the recuperator to atmosphere, and the variation of specific heat of air and combustion gases with temperature, which variation necessitates a correction factor for $DT_{rec}$, making it larger when below and smaller when above its mean value.

The problems of Otto engines and known recuperative engines of the prior art are solved by my invention wherein I provide a new and novel cylinder head which provides a working four-stroke cycle unit over each piston of an engine. The cylinder head contains an internal recuperator for heating the compressed air charge which air is then fed into an internal combustion chamber (also known in the art as a pre-chamber), admixed with fuel, and combusted. Life shortening of the recuperator through exposure to the flaming fuel-air mixture has also been eliminated by the use of a recuperator protective valve. The recuperator protective valve closes to separate the recuperator from the combustion chamber just prior to combustion. It reopens at the end of the expansion stroke to release the exhaust through the recuperator to atmosphere. The protective valve is needed in all but the smallest, lowest output engines to protect the recuperator from damage from the combustion flame front.

This arrangement of combustion chamber and compact recuperator obtains improved Carnot efficiency in a simple, cost effective manner, the heat losses caused by radiation and convection being reduced due to the recuperator having a volume on the order of only 5% of the cylinder displacement. Thermal losses are then reduced further by the use of a novel insulating liner around the recuperator and combustion chamber. In a preferred embodiment, a separated duct recuperator built around the exhaust valve provides further enhanced efficiency whereby a recuperative exhaust valve may be built as an integral unit.

In larger engines, residual energy still in the exhaust after it leaves the recuperator (perhaps as much as 25% of fuel energy), may be partially recovered with an exhaust driven turbo-alternator to produce electric energy. Since most engine applications already use an alternator to provide electric power, capture of alternator drive energy energy from the recuperative engine exhaust can take the place of the present alternator system and further improve efficiency.

The recuperative cylinder head may be engineered to match existing conventional engine blocks such as are used in modern gasoline fueled automobiles, thereby reducing the cost of changeover to new production. In addition, the head may be engineered to retrofit to the block of engines which originally had drive means such as a notched timing belt for operating overhead valves.

OBJECTS OF THE INVENTION

In this invention, an exhaust heat recuperator extracts heat from the exhaust, thereby lowering the heat rejection temperature and subsequently adds this heat to the compressed working charge prior to combustion, thereby raising the pre-combustion temperature which produces an equivalent increase (after adjustment for the change in specific heat) in the peak combustion temperature.

A first object of this invention is therefore to maximize, through the method of recuperation, the potential Carnot efficiency and the related actual working efficiency of a single piston internal combustion engine.

Another object is to provide effective recuperation in an engine with the minimum number of additional valves, pistons, recuperators, and other ironmongery, which in the preferred embodiment is reduced to a single reciprocating piston and four valves per engine unit.

A third object of this invention is to provide a coaxial, symmetric method of construction for a combustion chamber, recuperator, valving, and insulative housing all within a common cylinder head.

Another object is to provide a means for insulating a combustion chamber and recuperator with a simple mechanical construction that due to symmetry is resistant to thermal stress fracture and temperature non-uniformities.

Another object of the invention is to provide for an engine, a recuperator unit made in thermally segregated sections with reduced axial heat flow loss.

Another object is to provide a combination recuperator and exhaust valve in an assembly having separated parallel coaxial ducts comprising an outer one which carries exhaust from the combustion chamber out of the engine in a first direction, and an inner duct which carries compressed air in an opposite direction into the engine combustion chamber.

Another object is to provide a common duct recuperator having a tapering cross section along it flow axis to compensate for the changing viscosity of gases with temperature.

Yet another object is to provide a separated duct recuperator having tapering cross sections along its flow axes, the hotter ends of each duct having larger area, to compensate for the increasing viscosity of the gas flows with temperature.

Another object is to provide a method for installing a recuperator such that it may be easily removed for servicing, much like a spark plug.

Yet another object is to provide a recuperative cylinder head for easy attachment to new engine blocks and also easy retrofit to existing conventional engine blocks to replace conventional Otto Cycle cylinder heads.

BRIEF DESCRIPTION OF THE DRAWINGS

In order that the invention may be clearly understood and readily carried into effect, reference will now be made, by way of example, to the accompanying drawings, in which.

DETAILED DESCRIPTION OF THE INVENTION

A clear and better understanding of my invention can be had by reference to this description when taken together with the appended drawings, wherein like reference indicia refer to like elements of the invention.

Figures 1, 2:
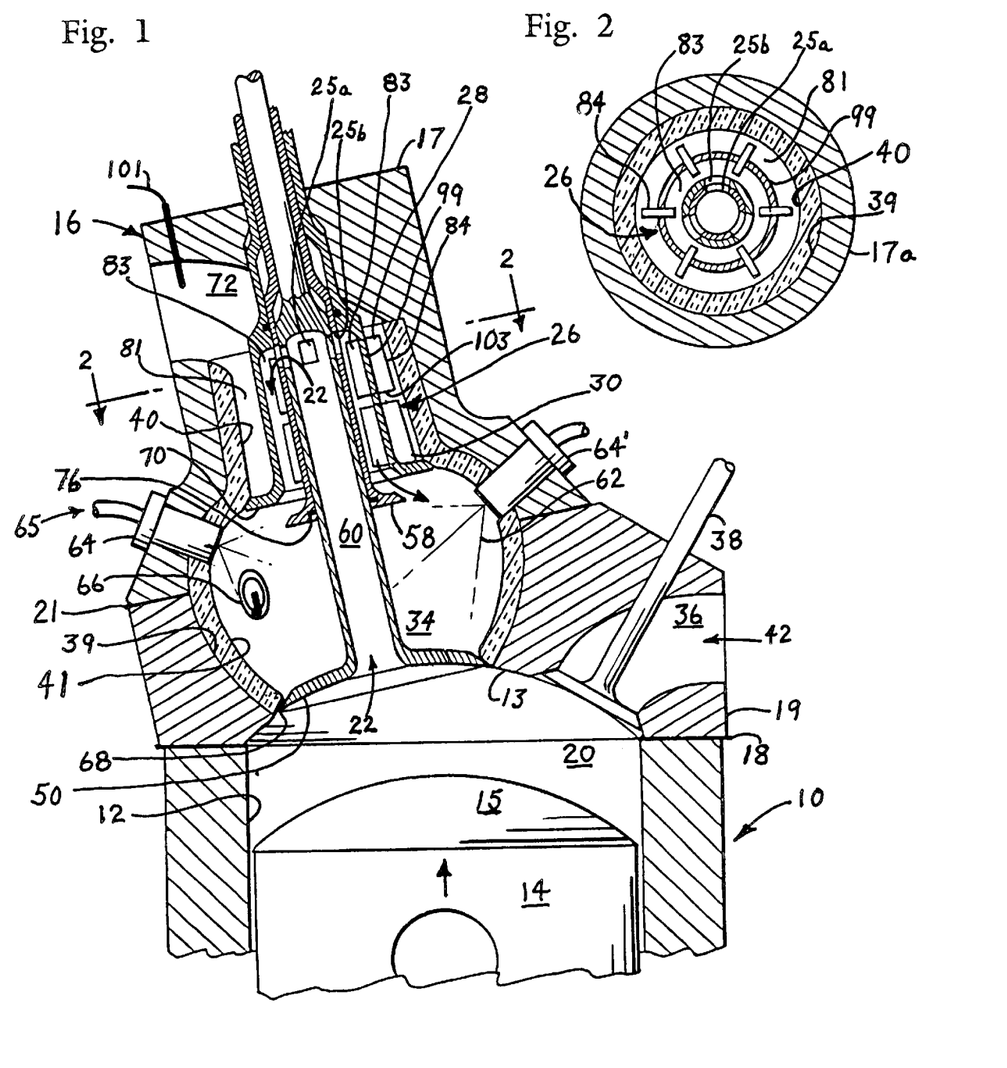
FIG. 1 is a sectional view of the preferred embodiment of the recuperative engine operable on a four-stroke cycle and having a single piston, a coaxial, separated duct recuperator, and four poppet valves.
FIG. 2 is a cross section of the separated duct recuperator taken along plane 2—2 of FIG. 1.

In the preferred embodiment of the engine shown in FIG. 1, a conventional liquid cooled cylinder block 10 similar to that used on automotive engines includes a cylinder 12 in which a piston 14 operates reciprocably between a top dead center and bottom dead center position to define a working volume 20. The head of piston 14 and the opposing surface of a recuperative head 16 are shaped such that volume 20 is minimized when piston 14 is at top dead center. The improvement comprises recuperative cylinder head 16 attached at joint 18 to enclose the open end of cylinder block 10 above the top dead center position. Recuperative cylinder head 16 defines a combustion chamber 34 and contains a recuperator 26 which are separated by a recuperator inlet valve 58 and a recuperator exhaust valve 80, all being concentric with a combustor valve 50 which separates chamber 34 from cylinder volume 20. An insulating liner 40 is illustrated containing chamber 34 and recuperator 26, but is not essential to operation of the recuperative engine. Combustor valve 50 is provided with an axial transfer duct 60 to pass compressed charge from cylinder 12 up through ports 25a and 25b defined by valves 50 and 58 to admit the charge to recuperator 26. Cylinder head 16 also defines an intake port 36 containing an inlet valve 38 for the admission of ambient air charge 42 into cylinder 12.

During operation, air is inducted into cylinder 12 on a downstroke of piston 14, then compressed to a small fraction of its ambient volume at which compression it is released by the opening of recuperator inlet valve 58 allowing the charge to flow through the inner duct 83 of recuperator 26 and into combustion chamber 34 which is also a small fraction of the ambient volume of the charge. During this flow, fuel is injected into the charge such as by injector 80. When piston 14 nears top dead center, recuperator inlet valve 58 closes, combustor valve 50 opens, and ignition occurs at spark plug 66. Combustion products now flow past valve 50 into cylinder 12 and expand against piston 14 driving it towards bottom dead center. When piston 14 nears bottom dead center, recuperator exhaust valve 80 opens allowing exhaust to blow back through combustor valve 50 which has remained open and through the combustion chamber and through duct 81 of recuperator 26 and through port 72 to atmosphere.

In engines designed for higher efficiency, a exhaust driven turbo-expander may be attached to port 72 to receive cooled gases from the engine and extract further work from them. The rotative work obtained may be used to drive an electric alternator, or to drive a turbo-compressor provide boost for the engine inlet air.

Referring now to FIGS. 1 and 2, in this preferred embodiment of the recuperative engine, recuperator 26 is a separated, coaxial duct arrangement wherein the exhaust passes through an outer annular duct 81 towards port 72 and the compressed air charge passes through inner annular duct 83, ducts 81 and 83 being concentric and in close thermal contact by means of thermally conductive recuperator fins 84 which pass radially through and conduct heat through tubular wall 99 of exhaust valve 58. The recuperator flows are countercurrent whereby they flow in opposite directions for good thermal transfer efficiency.

Recuperator 26 is tapered, ducts 81 and 83 being larger in cross section at the hotter end of the recuperator adjacent combustion chamber 34 and smaller in cross section at the end adjacent exhaust port 72.

The hot end of recuperator 26 for best cycle efficiency is maintained at close to the maximum temperature tolerance of the recuperator element comprising fins 84 and wall 99, a temperature presently around 2,000° F. when exposure is limited to exhaust gases consisting mainly of nitrogen with negligible oxygen content. The portion of fins 98 projecting into exhaust duct 81 operates hotter than the portion of fins projecting inward into compressed air duct 83. Since duct 83 contains air with oxygen, it must operate at a lower temperature. This is in fact how the temperature gradient will reside in normal operation.

Higher output engines may need a controller to limit air and fuel input to avoid exceeding the temperature tolerance of the recuperator. For this control, an electronic computer can be used which reads exhaust temperature in port 72 with sensor means 101 such as a thermocouple. The controller would receive these and other inputs such as RPM, ignition spark advance, throttle opening, engine coolant temperature, oil temperature, and possibly combustion noise to determine optimum fuel and air inputs with the goal being to attain high efficiency while preventing thermal or oxidation damage to the recuperator.

Temperature of the recuperator can also be controlled by limiting the surface area of fins 98 where they project into exhaust duct 81 to reduce their heat pickup and enlarging the surface area of fins 98 where they project into compressed air duct 83 to increase their heat transfer to the charge.

It should be understood that the recuperator temperature maximum is a mean temperature. The initial peak exhaust temperature during exhaust blowdown can run several hundred degrees above this temperature since the recuperator operates at an average between the mean exit temperature for the exhaust and the mean entrance temperature for the compressed charge.

The end of the recuperator adjacent to the exhaust port operates substantially cooler at about 1000° F. During operation of the engine, recuperator temperatures are higher when the engine is at full load and high RPM and lower when the engine is at minimum output and at low RPM. Recuperator temperatures also run higher when the fuel-air mixture is lean and above stoichiometric and the burning speed of the charge is lower.

While operating recuperatively, the fuel-to-air ratio can be leaned significantly more than when operated as an Otto engine, to an estimated 20:1 air-to-fuel ratio. The lean burn capability is believed to be due to the higher temperature of the fuel-air charge at the instant of ignition.

An additional benefit of the recuperator was that exhaust from the engine was appreciably quieter after it had passed through the recuperator.

Recuperator 26 is preferably segregated into at least two elements such as "cool element" 28 and a "hot element" 30, illustrated, the elements being thermally segregated in the axial direction by splits 103 to reduce detrimental axial flow of heat from the hot end to the cool end. Cool gases such as compressed air, flowing through the recuperator from the cool end to the hot end, are considered as flowing in a charging direction and are heated by the recuperator. Hot gases such as exhaust, flowing from the hot end towards the cool end, flow in an exhausting direction and lose their heat to the recuperator.

Cool element 28 and particularly hot element 30 of recuperator 26 are fabricated from a material that combines high thermal conductivity with resistance to oxidizing gas conditions up to the maximum temperature expected at that point in the recuperator. For example, hot element 30 may operate at 2,000° F. at the hot end adjacent recuperator valve 58 and require fabrication from a refractory material such as tungsten, while cool element 28 may operate at 1,200° F. at its hot end which may be tolerated by pure nickel or chromium plated nickel. Tubular stem 99 of recuperator exhaust valve 80 must also be resistant to high temperature and also requires high strength, but does not require high thermal conductivity.

The common duct recuperator is designed to have minimum volume commensurate with providing minimal resistance to compressed air and exhaust gas flows. This recuperator volume can be kept below 8% and is preferably held to less than 5% of the cylinder volume 20. Minimizing the gas volume within recuperator 26 and exhaust chamber 37 reduces the loss of air charge that remains trapped within the recuperator once the combustion chamber has been filled and the recuperator valve closes. This trapped air is swept out with the subsequent exhaust flow and constitutes a loss in efficiency. To reduce thermal losses from recuperator 26, it is mounted within liner 40 which provides thermal insulation against heat flow into cylinder head 16.

Figure 4:
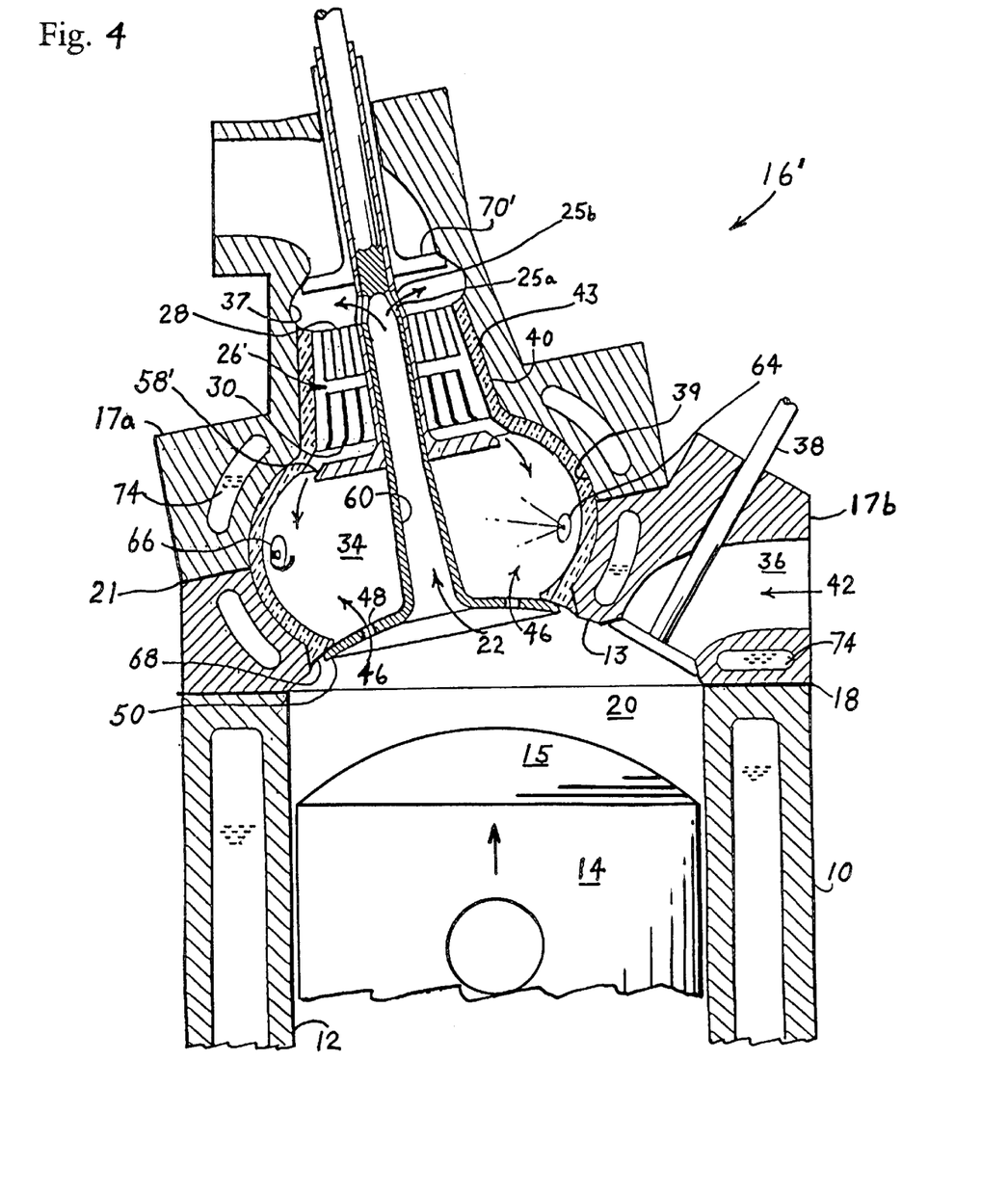
FIG. 4 is a sectional view of the cylinder head of a recuperative engine operable on a four-stroke cycle and having a single piston, a separated duct recuperator, and five poppet valves.

Referring to FIG. 4, cylinder head 16 defines a duct 60 which allows compressed gases to flow from cylinder volume 20 into recuperator 26 as per flow arrows 22. A transfer valve 56 may be used in duct 60 to more closely control the flow of compressed air from volume 20 to recuperator 26. Without this valve, exhaust gas may bypass, during the exhaust stroke, from volume 20 through duct 60 to the exhaust space 37 and out past exhaust valve 70 to atmosphere if the recuperator is somewhat restrictive to exhaust gas flow.

The volume of duct 60, like the volume of recuperator 26, is minimized for efficiency of the cycle, and duct 60 volume need only be large enough to provide charge transfer with a minimum of flow resistance and losses. This generally need only be on the order of 1 per cent of cylinder volume 20. Communication between recuperator 26 and combustion chamber 34 is controlled by the movement of recuperator valve 58 which controls gas flow between recuperator 26 and combustion chamber 34. The stem of recuperator valve 58 is sealed by high pressure seal 76 against pressures up to several hundred pounds per square inch created during charging of the combustion chamber 34, the seal preventing leakage along the valve stem to atmosphere.

A fuel injector 64 provides means for admixing fuel 65 with air within chamber 34. This fuel injection is preferably designed to admix efficiently with air flow as it passes around recuperator valve 58 into chamber 34. Once the compressed air charge is within chamber 34, recuperator valve 58 closes to protect the recuperator from combustion heat.

Ignition of air-fuel mixtures is provided by a spark plug 66 or its equivalent. Combustion gases from chamber 34 have access to the working volume 20 of cylinder 12, above piston 14, via port 68 defined by cylinder head 16, the port being valved by combustor valve 50. The stem of combustor valve 50 is sealed by high pressure seal 78 against combustion pressures up to one thousand pounds per square inch within combustion chamber 34 from leakage along the valve stem to atmosphere.

Combustor valve 50 operates hot since it passes hot combustion gases into volume 20 and then passes hot, spent gases back from volume 20 to chamber 34. Conventional cooling of combustor valve 50 occurs through its valve seat 25a during periods when the valve is closed tightly by spring pressure, which seat 25a is cooled by normal cooling means such as coolant passages 72 for cylinder head 16. Heat is also carried away by valve guide 53 defined by cylinder head 16, and by coolant passages 74 or by the equivalent cooling fins in the case of a direct air cooled engine. Additional cooling of combustor valve 50 is provided by a small portion, perhaps five per cent, of the bleed air charge during the compression stroke which is allowed to leak through multiple tiny holes 48 in the head of valve 50 into chamber 34.

After the combustion gases have expanded against piston 14 to produce work, and piston 14 is almost at bottom dead center, the gases are released by the opening of recuperator valve 58 and exhaust valve 70 whereby the gases reverse their flow, passing back through combustor valve 50, combustion chamber 34, recuperator valve 58, recuperator 26, exhaust chamber 37, exhaust valve 70, and exhaust port 72 defined by cylinder head 16.

In review, FIG. 4 illustrates an improved four-stroke internal combustion engine 10 having a single cylinder 12 and a single piston 14 reciprocating therein between top dead center and bottom dead center positions, wherein my improvement comprises a recuperative cylinder head 16 in which is located a recuperator 26 connected to a combustion chamber 34. An inlet duct 36 defined by cylinder head 16 and an inlet valve 38 located in duct 36 control the flow of atmospheric air 42 into cylinder 12 where the air is compressed on the next stroke of piston 14. After partial compression, recuperator valve 58 opens allowing the compressed air 22 to flow through duct 60 and through recuperator 26 and past recuperator valve 58 into combustion chamber 34 in series. An injector 64 adds fuel 62 to the compressed air 22 as it enters chamber 34 and a spark plug 66 ignites the fuel-air mixture within chamber 34. The burning gases are then released by combustor valve 50 to flow into cylinder 12 where they expand and force piston 14 towards bottom dead center. Combustor valve 50 remains open and after the gases expand in cylinder 12, they are released by the opening of recuperator valve 58 and exhaust valve 70 to flow back through combustor valve 50, combustion chamber 34, recuperator valve 58, recuperator 26 and an exhaust valve 70 which releases the gases through port 72 to atmosphere.

For better control over flow 22, a transfer valve 56 may be installed in duct 60 to release compressed air from cylinder 12 into recuperator 26 at the same instant that recuperator valve 58 opens to release the air into combustion chamber 34.

Figure 3:
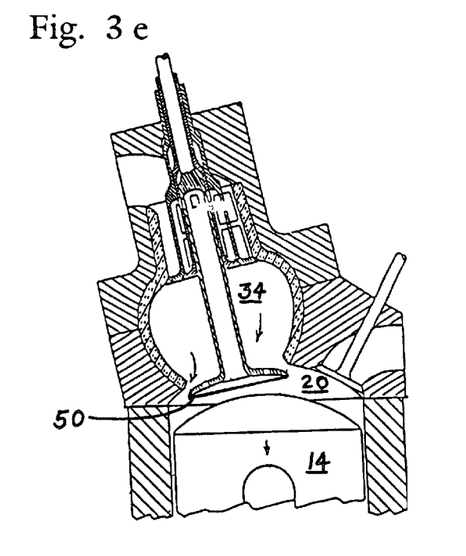
FIGS. 3a–3h are sequential sectional views illustrating the gas cycle of the recuperative engine of FIG. 1.
Figure 3A:
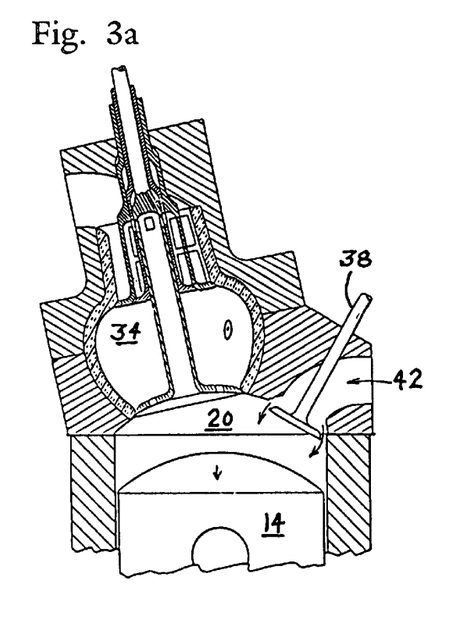

Turning now to FIG. 3a through 3h, there is shown the recuperative gas cycle carried out in an engine similar to the preferred engine embodiment of FIG. 1. The cycle proceeds as follows:

On a first stroke of the piston 14 from top dead center to bottom dead center, as illustrated in FIG. 3a, inlet valve 38 opens at top dead center and allows a charge of ambient air to be inducted through inlet duct 36 and into cylinder 12.

Figure 3B:
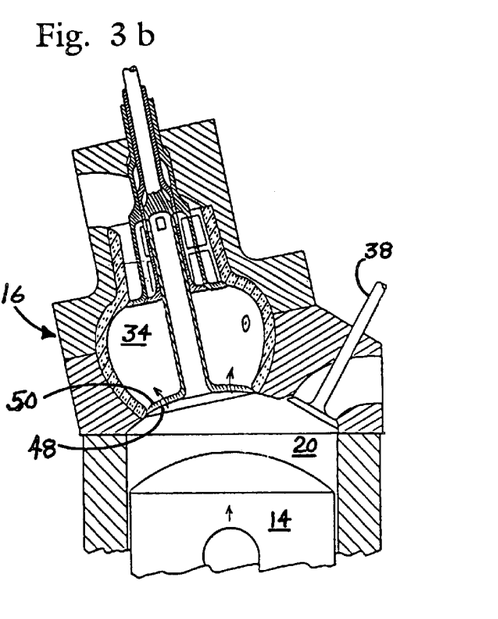

As piston 14 passes bottom dead center, inlet valve 38 closes and for a major portion of the return stroke to top dead center, piston 14 compresses and adiabatically heats the air charge within space 20, as illustrated in FIG. 3b.

Figure 3C:
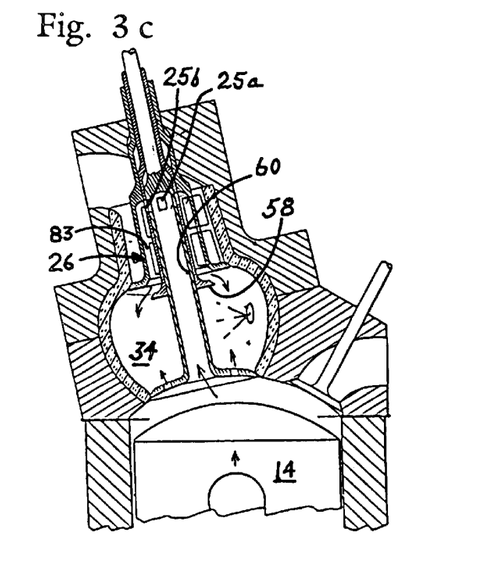

During the remainder of the second stroke, shown in FIG. 3c, recuperator valve 58 opens briefly to allow the charge of compressed hot air to be forcibly transferred from space 20 through duct 60, recuperator 26, past recuperator inlet valve 58, and into combustion chamber 34. During this transfer, the hot air charge is allowed to leak from cylinder space 20 through multiple small cooling holes in combustor valve 50 into combustion chamber 34. This leakage flow provides cooling for valve 50.

Figure 3D:
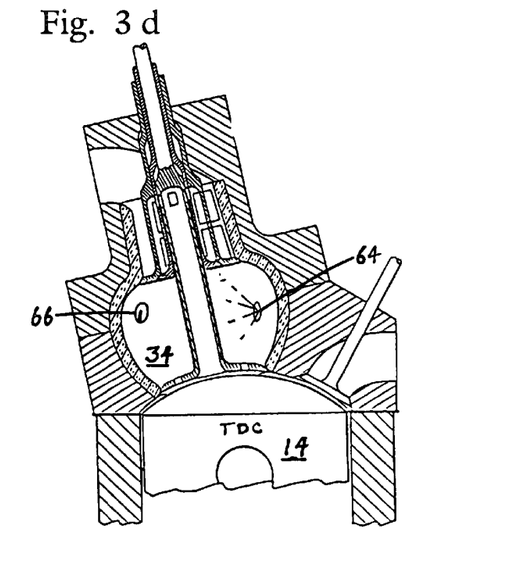

As piston 14 passes top passes top dead center in FIG. 3d, recuperator valve 58 closes and the doubly heated air charge, now within chamber 34 and containing fuel, is ignited and combusts to produce high temperature and pressure gaseous products within the chamber.

Combustor valve 50 opens immediately and as piston 14 leaves top dead center on its third stroke in FIG. 3e, hot, high pressure combustion gases flow from combustion chamber 34 into cylinder space 20, expand against piston 14, and generate work.

In FIG. 3f, the exhaust gases are partially expanded, but still hot and at high pressure, while piston 14 is approaching bottom dead center. Recuperative exhaust valve 70 now opens to allow these gases to blow down through combustor valve 50, exhaust duct 82, and exit to atmosphere. During this gas blowdown, most of the residual gas heat is transferred to the wall of the combustion chamber 34, the head of recuperative exhaust valve 80, and recuperator 26.

During a fourth stroke of the piston towards top dead center as shown in FIG. 3g, residual, hot exhaust gases remaining in the cylinder at close to ambient pressure are forcibly ejected to atmosphere during which ejection, further heat is captured by the chamber walls, recuperator valve 58, recuperator 26, and exhaust valve 70.

All valves close briefly as piston 14 passes top dead center at the end of its fourth stroke down shown in FIG. 3h.

FIGS. 3a through 3h illustrate the complete recuperative cycle performed in a single piston engine. FIG. 3a shows inlet valve 38 having just opened and piston 14 on a first stroke towards bottom dead center, thereby drawing in a charge of fresh air.

In FIG. 3b, inlet valve 38 has closed and piston 14 is on its second and return stroke to top dead center, compressing the charge against minimal clearance volume 20 between the head of piston 14 and the cylinder head 16. Some air flows through the hollow stem of valve 50' thereby cooling it, and into the space within the recuperator air duct 83 during initial compression of inducted air in cylinder 12 and volume 20. The actual combined volume of recuperator 26 and duct 60 is only a few per cent of the maximum cylinder volume 20. Another few per cent of the compressed air flows through tiny holes 48 in combustor valve 50' and into combustion chamber 34 thereby providing cooling for the head of combustor valve 50'.

In FIG. 3c, recuperator inlet valve 58 opens as piston 14 compresses the air through between 65% and 90% of its full stroke, and the compressed air flows through recuperator air duct 83 past valve 58 into combustion chamber 34, picking up heat during the transfer.

In FIG. 3d, piston 14 has reached top dead center and forced all but a few per cent of the inducted air charge into combustion chamber 34. Recuperator inlet valve 58 closes at the same instant piston 14 reaches top dead center and fuel 65 has been spraying from injector 64 into chamber 34 to create a combustible mixture. Ignition now occurs by spark plug 66, combusting the mixture within combustion chamber 34.

Combustor valve 50' also opens as the mixture combusts in FIG. 3e, releasing the high pressure gases to flow into cylinder space 20 and force piston 14 on its third and power stroke towards bottom dead center.

In FIG. 3f, piston 14 is about to pass bottom dead center and recuperative exhaust valve 58 opens to release the exhaust gases to blowdown past combustor valve 50', through combustion chamber 34, past recuperative exhaust valve 80, through recuperator duct 81 and out exhaust port 72.

In FIG. 3g, blowdown has finished and piston 14 makes its fourth stroke towards top dead center, driving residual exhaust gases out the same route described above.

In FIG. 3h piston 14 has completed its exhaust and fourth stroke to top dead center, all valves close momentarily, and the cycle is ready to repeat at FIG. 3a.

The engine illustrated in FIG. 1 is a four-stroke engine with an operating cycle as follows:

1. on a first stroke of piston 14, inlet valve 38 is opened and the piston makes a stroke to bottom dead center to draw in a charge of ambient air;
2. on a first portion of a second stroke towards top dead center, the air charge is compressed through between 65% and 90% of the full stroke, at which point recuperator valve 58 opens releasing the compressed air to travel through duct 60 and ports 25a and 25b and through duct 83 of recuperator 26 and into combustion chamber 34;
3. during the remainder of the second stroke, fuel is admixed with the air charge as the air is driven through the recuperator and into combustion chamber 34 by piston 14 as it approaches top dead center;
4. recuperator valve 58 now closes and ignition occurs at the same instant that combustor valve 50 is opened, all occurring as piston 14 passes top dead center;
5. the combustion products now expand through combustor valve 50 into cylinder 12, forcing piston 14 on its third stroke towards bottom dead center and performing work against the piston;
6. at the end of the third stroke near bottom dead center, combustor valve 50 remains open and recuperator valve 58 and exhaust valve 70 open to allow the partially spent gases to blow down through combustion chamber 34, duct 81 of recuperator 26, and exhaust port 82 in series to atmosphere.
7. During the fourth stroke and return to top dead center, the residual products of combustion are forcibly expelled through the combustion chamber, duct 81 of the recuperator, and exhaust port in series to atmosphere at which point the combustor valve, recuperator valve, and exhaust valve close, and inlet valve 38 re-opens for the next cycle.

Figure 5:
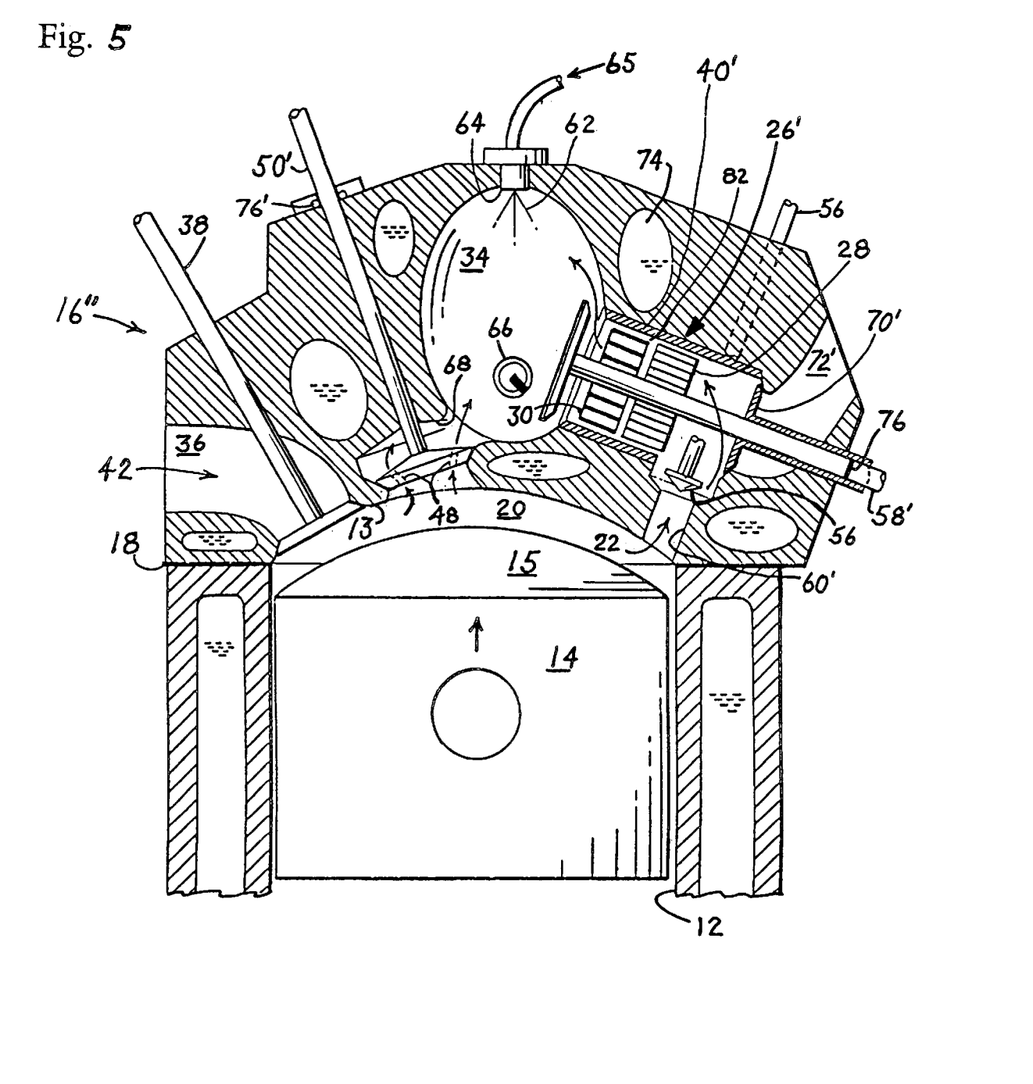
FIG. 5 is a sectional view of the cylinder head of a recuperative engine operable on a four-stroke cycle and having a single piston, a common duct recuperator, and four poppet valves.

FIG. 5 illustrates an alternative embodiment of my invention which differs from FIG. 1 in that it has a common duct recuperator 26. Recuperative cylinder head 16 is split into two parts comprising a cap 17a and a base 17b, the cap being connected to the base at joint 21. A pocket 39, defined by cap 17a and base 17b at joint 21, encloses and holds combustion chamber liner 40 in place. Liner 40 provides thermal insulation for combustion chamber 34 and recuperator 26 due to an insulating interface 43 which the liner forms with pocket 39. Inlet port 36 is defined in this embodiment by base head 17b

Liner 40 is preferably made of a refractory material similar to that used for exhaust valves and capable of operating at high temperature in excess of 2,000° F. The liner may be thin and mechanically supported by the pocket, while the interface still provides substantial insulation effect. Alternatively, the liner may be thick enough to mechanically support combustion pressures and provided with additional clearance at interface 43, which interface may then be fitted with thermal insulation such as asbestos. Fuel injector 64 and ignition means such as spark plug 66 are preferably fitted gas tight into liner 40 to prevent the leakage of combustion gases into interface 43.

This embodiment of the single piston recuperative engine in FIG. 5 also employs three valves and a recuperator arranged in a group coaxial with liner 40. The inner valve in this group is combustor valve 50' which has additional provisions for cooling. The first provision comprises bore 60 of the hollow stem of valve 50' which serves to transfer compressed air to holes 25a and 25b defined by valves 50' and 58' and thence into exhaust chamber 37, and to cool the stem of combustor valve 50' while said transfer occurs. Multiple holes 48 defined by valve 50' also provide for cooling by allowing a small percentage of compressed air to leak from cylinder 12 into combustion chamber 34 during the compression stroke.

The middle valve in the group is a recuperator valve 58' which has a hollow stem to serve as a valve guide for combustor valve 50'. The outer valve in the group is exhaust valve 70 with a hollow stem that serves as a valve guide for recuperator valve 58'.

Recuperator 26' in this embodiment has a tapered cross section, being larger at the hot end than is at the cool end. This provides for a more uniform velocity of the gases flowing through the recuperator as the gases change temperature and therefore volume during their passage from hot to cool end in the case of exhaust gases, and from cool to hot end for air flowing towards the combustion chamber. In addition to compensating for change in gas volume during passage of each gas charge, the taper also compensates for change in viscosity with the change in temperature, since the viscosity of gases increases considerably with temperature and the increasing sectional area in recuperator 26' prevents the viscous drag from becoming excessive. Since both the volume and the viscosity of the gas flow change with temperature, the sectional change of the recuperator should change approximately 1.5 times the change in absolute temperature. Thus if the exhaust gas temperature drops by 600° Rankine and the initial temperature was 3,000° Rankine, the percentage change is 20% and the cross section should taper and reduce by 30% in that flow direction.

FIG. 2 is a sectional view of the preferred embodiment of my invention. The recuperative cylinder head 16 is attached to an engine block 10 with a cylinder 12 and a piston 14 therein. which reciprocates between top dead center and bottom dead center positions. The recuperative cylinder head 16 is joined to engine block 10 at joint 18 so as to enclose the end cylinder 12 above the top dead center. Cylinder head 16 is built in two sections, a base head 17a and a cap 17b' which adjoins base head 17a at joint 21, thereby to enclose combustion chamber liner 41 within pocket 39.

This preferred embodiment in FIG. 1 of the single piston recuperative engine also employs three valves arranged in a coaxial group within combustion chamber liner 41. The inner valve in this group is combustor valve 50 for control of gas flow between combustion chamber 34 and cylinder 12. Combustor valve 50 slides in a hollow stem defined by the recuperator valve 58 located in the middle of the group of valves.

Referring to both FIGS. 1 and 5, the outer valve in the group is a multifunction recuperative exhaust valve 80. This valve has a tubular portion 99 which is spaced from the inner surface of liner 41 to provide an annular exhaust duct 81 for the passage of exhaust gas to the atmosphere. Radial fins 84 made of a high thermal conductivity material capture exhaust heat and conduct it into an annular compressed air duct 83 formed on the inside of tubular portion 81 where the captured heat is transferred to the compressed charge. Recuperative exhaust valve 80 has a hollow stem 90 that serves as a valveguide for recuperator valve 58. The construction shown in FIGS. 1 and 5 is representative of only one of many possible constructions for the recuperator.

To produce a combustible mixture, injector 64 may be used to spray fuel 62 directly into combustion chamber 34. Alternatively, more rapid and more efficient mixing of fuel with the entering compressed air may be obtained by spraying fuel across the air as it enters chamber 34 through the opening of recuperator valve 58. One such method is to pipe fuel in along the stem of the recuperative inlet valve 58 and released radially from the underside of the head of valve 58 as per flow arrows 88.

Figure 6:
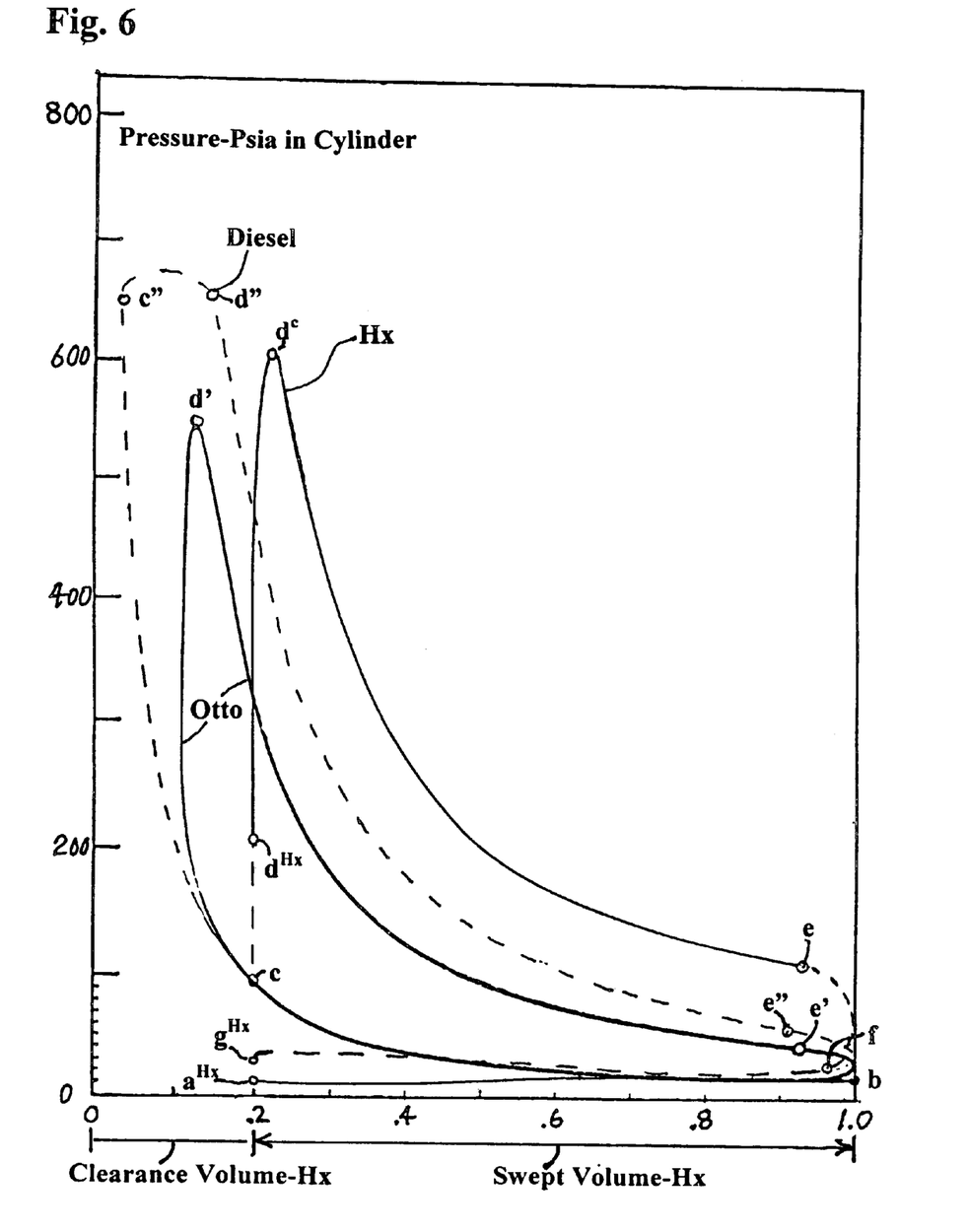
FIG. 6 is a linear pressure vs. volume graph comparing Hx, Otto and Diesel cycles.

Referring now to FIG. 6, a linear pressure versus volume (P-V) graph has been drawn to illustrate differences between the four-stroke Hx, Otto, and Diesel cycles in a reciprocating piston engine. In this graph, the Hx, Otto, and Diesel P-V curves have been normalized to essentially equal swept volume whereby they start from points, $a^{Hx}$, $a^O$, and $a^D$, and induct an air charge along a common curve to maximum cylinder volume at a common point b, where the piston is at bottom dead center.

Compression of the air charges continues along common curves from point b to point c. From point c, the Diesel curve is dotted and continues with further compression to point c" at which point fuel is injected under approximately constant pressure and increasing volume to point d", and from d", combustion gases expand along dotted line to e", and are then exhausted along a substantially common curves to g".

The Otto cycle continues from point c with a dashed line to c' where combustion occurs which drives the pressure up to point d', followed by expansion of combustion gases along dashed line to e' and exhaust of gases along the substantially common curves to point g'.

The Hx cycle undergoes a perturbation at point c, when the compressed charge is released to pass through the recuperator into the combustion chamber, and travels an indeterminate path up to point $d^{Hx}$. The release causes the pressure to momentarily fall as the gas expands into and through the recuperator and then heating of the compressed air causes a rapid increase in pressure up to point $d^{Hx}$ with no input yet of fuel energy. At point $d^{Hx}$, the compressed air has been sealed in the combustion chamber, admixed with fuel, and ignited causing an increase in pressure to point $d^c$ comparable to that which occurs in the Otto cycle but reaching a higher pressure. From $d^c$ the combustion gases are expanded along the solid curve to point e where they are released to flow through the recuperator (with some slight back pressure causing the curve to ride above the curves for Otto and Diesel), and then be expelled to atmosphere along solid curve to point $g^{Hx}$.

In FIG. 6, one characteristic of a linear P-V graph is that the area inside a closed curve is proportional to the indicated mean effective pressure produced by an engine, and which also correlates with the output power of the engine. Within the equivalent accuracy of the three gas cycles, it may be seen that the Hx curve has substantially more area than the Otto for a similar input of fuel and is not much less than the area displayed by the Diesel. It is also shown in FIG. 6 that the Hx cycle achieves substantially greater power while working at just slightly higher pressures than the Otto cycle. The peak working pressure of an engine, such as at points $d^c$, d', and d" is generally a direct indicator of the engine's weight. The Hx engine therefore appears to not be at any great disadvantage weight wise with the Otto engine.

Figure 7:
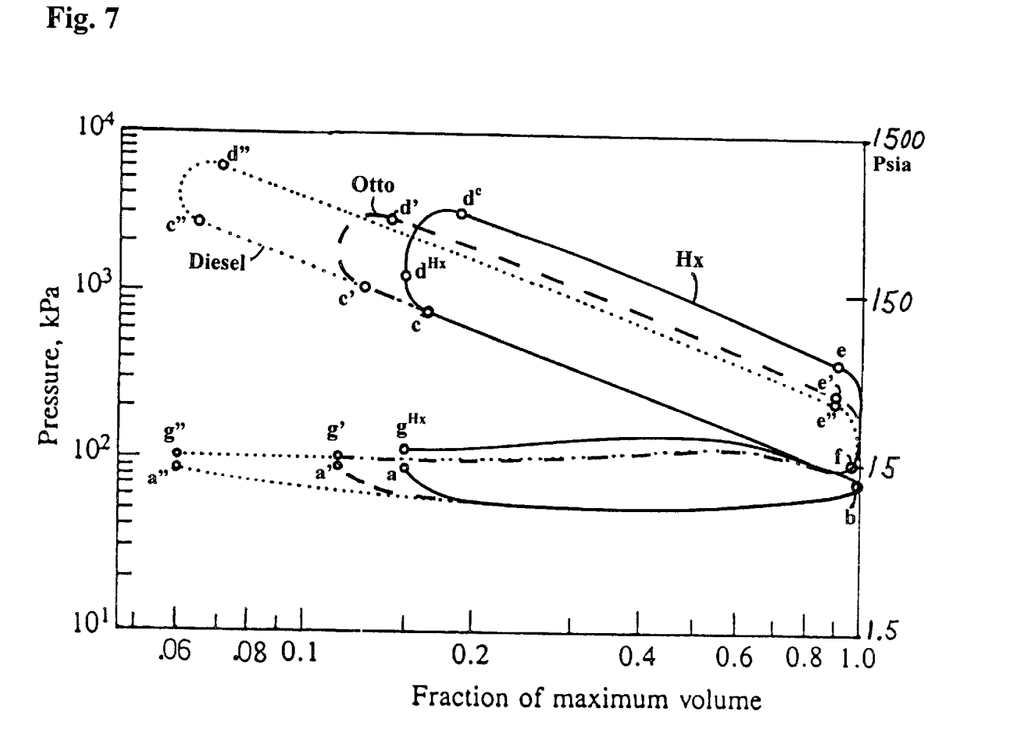
FIG. 7 is a log p vs. log ($V/V_{max}$) graph comparing Hx, Otto and Diesel cycles.

FIG. 7 illustrates the same Hx, Otto, and Diesel cycles as FIG. 6 but on a logarithmic pressure versus volume curve. A log-log graph accentuates low pressure effects and shows much more clearly those low pressure changes which occur during induction and during exhaust expulsion. The expulsion of the Hx cycle from point f to $g^{Hx}$ has more back pressure due to the presence of the recuperator than the f to g' and f to g" expulsion curves of the Otto and Diesel respectively. This back pressure illustrates the importance of designing the recuperator for low back pressure on the exhaust flow, and also illustrates why the separated flow recuperator is preferred as it allows freer flow for the exhaust while avoiding the waste of trapped air which occurs with the common duct recuperator. The log-log P-V illustrates clearly the parallality of the expansion curves d' to e', d" to e", and $d^c$ to e to the compression curve b to c, common to all three gas cycles, and distinguishes clearly the point at which compression ends and heat addition to the gas begins.

MODE OF OPERATION

During operation of the engine of FIG. 1, inlet valve 38 is opened as piston 14 starts to descend on a first stroke from top dead center towards bottom dead center, inducting a charge of ambient air as shown by arrow 42 through inlet duct 36 and into working volume 20 of cylinder 12. During the induction of ambient air, combustor valve 50 and recuperator valve 58 remain in a closed state. Inlet valve 38 also closes as piston 14 begins its second stroke and return to top dead center which compresses said air within cylinder 12. A small percentage of the air undergoing compression bleeds into combustion chamber 34 through multiple coolant passages 48 in valve 50. The remainder of the air undergoing compression is compressed in cylinder 12 against closed valves to a volume approximately equal to the combined volume of duct 60, recuperator 26, and combustion chamber 34 and then passed in a compressed state from working volume 20 through duct 60, past now open transfer valve 56, and thence through recuperator 26, where the compressed air is heated by approximately 400 to 600° F. or more during its passage, and past now open recuperator valve 58 into combustion chamber 34. Exhaust valve 70 remains closed during the third stroke of piston 14 back to bottom dead center, as well as during its fourth stroke and return to top dead center. Fuel injection, as indicated at 62 and provided by injector 64 is carried on during the flow of compressed air into chamber 34, and recuperator valve 58 remains open until piston 14 reaches top dead center initiated prior to piston 14 reaching top dead center, and valve 58 remains open until piston 14 reaches top dead center to allow for completion of the flow of compressed air and the simultaneous mixing of the injected fuel with the compressed heated air flowing into chamber 34.

Valve 58 is now closed simultaneously with initiation of ignition, as by spark plug 66, and combustor valve 50 is opened before there has been any significant rise in pressure from combustion of the gas-fuel mixture in combustion chamber 34. With valve 50 open, the gaseous combustion products are free to pass through duct 68 into working volume 20 to urge piston 14 towards bottom dead center and produce work. (After piston 14 has proceeded about two-thirds of the distance towards bottom dead center, the gas pressure in working volume 20 and combustion chamber 34 will drop below the gas pressure in recuperator 26. At this point, it is advantageous to re-open valve 58 to allow residual hot compressed gas from recuperator 26 to reach working volume 20 via combustion chamber 34 and duct 68 and thereby perform additional useful work by urging piston 14 towards bottom dead center with renewed urgency.) When piston 14 has advanced roughly 95 per cent of the distance towards bottom dead center, exhaust valve 70 which has hitherto been closed is now opened to allow the gas in working volume 20 to exit in series via duct 68 valved by combustor valve 50, combustion chamber 34, recuperator 26, exhaust valve 70, and duct 72 to the atmosphere during the subsequent motion of the piston towards top dead center.

It should be understood that FIG. 1 does not show standard components of an internal combustion engine except for those which are essential for an understanding of my invention. Thus, there is no illustration of a crankshaft, or a connecting rod, or a cam shaft to actuate piston 14 and the four valves 38, 50, 58, and 70. Those of normal skill in the art of internal combustion engines will have no difficulty in applying their knowledge to mentally supply these standard components which were not included in the drawing.

Those same persons of normal skill in the art will appreciate the fact that inlet valve 38 obtrudes duct 36 leading to working volume 20, which volume is defined by piston 14 moving in cylinder 12 between limits defining a top dead center and a bottom dead center. When valve 38 is open, ambient air is drawn into volume 20 as piston 14 moves towards bottom dead center, and the air is compressed in working volume 20 as piston 14 ascends towards top dead center, and when near top dead center, valve 58 opens to allow the compressed air to pass as per arrow 22 into and through duct 60, past now open valve 56, through recuperator 26 where it is heated during its passage, and past valve 58 into combustion chamber 34, the compressed air to be heated during transit through recuperator 26. A small amount of compressed air from working volume 20 passes through the coolant openings 48 in valve 50 and directly into combustion chamber 34 via port 68. This system comprising valve 38, working volume 20, piston 14, duct 60, recuperator 26 and valve 58 constitute a means for selective control of compressed air passing through the recuperator 26 to the combustion chamber 34.

It is also shown in FIG. 1 that fuel 62 is added to the heated compressed air in combustion chamber via injector 64 and the resulting mixture ignited by spark plug 66 causing burning and generation of gaseous ignition products which are released from combustion chamber 34 via port 68 into working volume 20, with valve 50 open, to act upon piston 14, urging it towards bottom dead center. These components operating in sequence constitute a means for adding fuel to the compressed air in combustion chamber 34 and for igniting same and for selectively controlling the release of the gaseous ignition products to the cylinder to urge the piston towards bottom dead center. As piston 14, under control of the crank shaft and the connecting rod, not shown, ascends from bottom dead center, the expanded gaseous ignition products are expelled from the working volume 20 of cylinder 12 to exhaust to the atmosphere via port 68, combustion chamber 34, and recuperator 26, while valve 70 is open to exhaust duct 72. These elements, when working in the described sequence, constitute a means for selectively controlling the release and subsequent forcible expulsion of gaseous ignition products from the cylinder via the combustion chamber and recuperator, in series, to exhaust to the atmosphere.

During operation of the engine of FIG. 5, inlet valve 38 is opened as piston 14 starts to descend from top dead center towards bottom dead center, drawing in ambient air as shown by arrow 42 through inlet duct 36. During the induction of ambient air, valve 50', 58' and 70 remain in a closed state. Inlet valve 38 is closed as piston 14 begin its ascent from bottom dead center. As previously mentioned, a small portion of the air 46 undergoing compression is bled into combustion chamber 34 through coolant passages 48 in valve 50'. The remainder of the gas undergoing compression is compressed to approximately the compression ratio of the engine and then released by the quick opening of valve 58' to allow passage of air in a compressed state from working volume 20 through duct 60' and holes 25a and 25b and thence through recuperator 26, where it is heated during its passage, and past valve 58 into combustion chamber 34. Exhaust valve 70 remained closed during the downstroke of piston 14 to bottom dead center, as well as during its return to top dead center. Fuel injection, as indicated at 62, by injector 64 is initiated as soon as compressed air begins its transfer into chamber 34, and continues until piston 14 has reached top dead center and the compressed air transfer is completed. Valve 50' now opens. The gaseous products mixture urge piston 14 towards bottom dead center. Hot compressed air travel through the recuperator after valve 58' open. Part of the hot gases also bleed through the holes 31a and 31b. Exhaust valve 70 allows the burnt gases to exit to the ambient atmosphere.

OPERATING RESULTS

Development of the recuperative cylinder head was an iterative process during which a series of seven prototype cylinder heads were built and tested. The last two of these were a single piston and a dual piston version of a recuperative engine. Results from them demonstrated that the recuperative gas cycle is effective and able to deliver substantially lower exhaust temperature, the single piston delivering approximately 400° F. reduction and the dual piston over 600° F. reduction in exhaust temperature.

In the dual piston prototype recuperative engine operable for development purposes in either the recuperative mode or the approximate Otto mode by the insertion or removal of the recuperator, exhaust from recuperative mode operation exitted the engine cylinder head at about 650° F. versus approximately 1,250° F. (600° F. cooler) when the engine was operated in the Otto mode with the recuperator element removed. By Carnot's Law, this reduction in exhaust temperature translates to an improvement in gas cycle efficiency for the recuperative cycle of approximately 30% over the Otto.

The dual piston two-stroke embodiment was similar to that illustrated in FIG. 4. The dual piston recuperative head was fabricated to fit on a Ford Pinto 4 cylinder 2.0 liter engine block which was used as a basic test block. Cylinders 1 and 4 were blanked off and the pistons 1 and 4 were left in for mechanical balance. Cylinders 2 and 3 were used for the compressor and combustor pistons which operated in phase. The compressor and the combustor cylinders were left at their basic displacement of 30.6 cubic inches each.

An inlet duct and valve was built into the cylinder head to admit an air charge into the compressor cylinder. A recuperator duct having an adjustable internal diameter of either 0.75" or 1.00" and a length of 2.7" was built into the recuperative cylinder head between the cylinders. The initial recuperator element was 0.060" thick copper sheet rolled into a spiral 1.25" long×1.00" diameter, fixed in place in the duct by transverse pins. A transfer valve comprising a poppet valve 0.5" diameter was built over the compressor cylinder to release charge from the compressor cylinder into an 0.4" diameter duct 3.4 long which connected with the "cool end" of the heat exchanger duct. At this same "cool end" of the recuperator duct, an 0.9" in diameter exhaust valve was fitted to release spent exhaust gases to the atmosphere.

The opposite or "hot" end of the recuperator duct adjoined a combustion chamber 0.8" deep×3.0" diameter which was also built into the recuperative head, the hot end of the recuperator being fitted with a 1.4" diameter recuperator valve to control the flow of gases between the recuperator and the combustion chamber and to shield the recuperator from combustion gases. The compression/expansion ratio of this cylinder was 6.40:1.

A variable fuel feed carburetor was used for test purposes to admix fuel with the inducted air prior to compression, although it is preferred and recommended in practicing the invention that fuel be admixed with the air after compression and after passage at least part way through the recuperator. Admixture of fuel is preferred to occur at or beyond a point in the recuperator where the temperature is high enough to avoid buildup of deposits on the recuperator element.

Upon startup of the engine, the recuperator 26, which is initially at ambient temperature, quickly warms up and after a few dozen engine cycles, reaches operating temperature, as indicated by changing operation of the engine. Initial operation of the engine is thus much like that of an engine operating on an Otto cycle but as the recuperator warms up, the engine cycle becomes recuperative. One indication of recuperator warm-up is that the fuel feed can be leaned for about 60 seconds after startup, and beyond that time, the optimum fuel adjustment remains constant. Another indication of recuperator warm-up is exhaust gas temperature which rises quickly at first startup and then assymptotically approaches a constant value.

Having complied with the statute by clearly and fully describing the practice of my invention including the construction and operation of same in such clear and concise manner that those inventors and artisans of normal skill in the art and in allied arts will be able to understand and practice same without need for experimentation, I wish it to be known that this invention is not to be limited by the examples in the drawings and specifications. The scope of the invention is only limited by the appended claims.

I claim:

1. In a four-stroke internal combustion engine having a cylinder with a piston reciprocating therein between limits defining a top dead center and a bottom dead center, the improvement comprising:

means defining a recuperative cylinder head having an internal recuperator coupled to an internal combustion chamber;

means for selectively controlling the flow of air from the atmosphere into said cylinder;

means for selective control of compressed air passing through said recuperator in a first direction to said combustion chamber;

means for adding fuel to said compressed air and for igniting same and for selectively controlling the release of the gaseous ignition products to said cylinder to urge said piston toward said bottom dead center; and means for selectively controlling the flow of said gaseous ignition products from said cylinder via said combustion chamber and said recuperator in reverse to said first direction to release said gaseous products to the atmosphere.

2. The invention of claim 1, further comprising valve means for selectively controlling the flow of compressed air passing from said cylinder to said recuperator.

3. In a recuperative four-stroke internal combustion engine having a cylinder with a piston reciprocating therein between limits defining a top dead center and a bottom dead center, the improvement comprising:

means defining a cylinder head attached to said cylinder and having an internal recuperator coupled to an internal combustion chamber;

valve means for selectively controlling the flow of air from the atmosphere into said cylinder;

means for selective control of compressed air passing from said cylinder through said recuperator in a first direction to said combustion chamber;

means for adding fuel to said compressed air as it enters said combustion chamber and for igniting same and for selectively controlling the release of the gaseous ignition products to said cylinder to urge said piston toward said bottom dead center; and means for selectively controlling the flow of said gaseous ignition products from said cylinder via said combustion chamber and said recuperator in reverse to said first direction and for selectively controlling the release of said gaseous products to atmosphere wherein said piston follows the steps of:

a. inducting ambient air into said cylinder during a first stroke with said piston moving towards said bottom dead center;

b. compressing said air during a major portion of a second stroke towards said top dead center;

c. forcing said air in a compressed state through said recuperator and into said combustion chamber during the remaining portion of said second stroke;

d. receiving energy from the expansion of said gaseous ignition products during a third stroke towards said bottom dead center; and e. exhausting said gaseous ignition products via said combustion chamber and said recuperator in series during a fourth stroke towards said top dead center.

4. The invention of claim 1, wherein said recuperator is divided into multiple thermally segregated sections along its axis of gas flow.

5. The invention of claim 1, wherein said recuperator has a cross-sectional area for gas flow that increases toward said combustion chamber.

6. The invention of claim 1, wherein said recuperator means is a separated duct recuperator and said recuperator further comprises a first duct means which provides for the flow of compressed charges in a first direction and a second duct means which provides for the flow of combusted and expanded gases in a second direction opposite to said first direction and said first and second duct means are in intimate thermal relationship.

7. The invention of claim 1, wherein said means for adding fuel to said compressed air comprises means for addition of said fuel to said compressed air as the air passes through the recuperator.

8. The invention of claim 1 further comprising a detachable cap on said cylinder head and said cap and cylinder head define an internal pocket and said recuperator and combustion chamber are contained by a liner which fits within said pocket.

9. The invention of claim 8 wherein said liner contains said recuperator fixed in place and said combustor valve and said recuperator valve and said exhaust valve are arranged coaxially within said liner and said recuperator.

10. The invention of claim 8 wherein said liner contains a combustor valve and a recuperator valve and a recuperative exhaust valve supported coaxially within said liner.

11. In a recuperative four-stroke internal combustion engine having a cylinder with a piston reciprocating therein between limits defining a top dead center and a bottom dead center, the improvement comprising:

a cylinder head having an internal recuperator coupled to an internal combustion chamber;

an inlet valve within said cylinder head for controlling the flow of air from the atmosphere into said cylinder;

means providing for the flow of compressed air from said cylinder to said recuperator;

a recuperator valve for controlling the flow of compressed air passing through said recuperator in a first direction to said combustion chamber;

means for adding fuel to said compressed air as it enters said combustion chamber and for igniting same and a combustor valve for controlling the release of the gaseous ignition products to said cylinder to urge said piston toward said bottom dead center and for controlling the flow of said gaseous ignition products from said cylinder via said combustion chamber and said recuperator in reverse to said first direction; and an exhaust valve for controlling the release of said gaseous products to atmosphere.

* * * * *